US007676793B2

(12) United States Patent
Himmer et al.

(10) Patent No.: US 7,676,793 B2
(45) Date of Patent: Mar. 9, 2010

(54) DETERMINATION OF DEPENDENT OBJECTS BY A SOURCE CONTROL SYSTEM AND A METHOD TO AUTOMATICALLY INCLUDE THOSE OBJECTS WITH THE PARENT OBJECT WHEN CHANGES ARE ENABLED

(75) Inventors: Richard P. Himmer, Blue Bell, PA (US); Jeffrey B. Scott, Lexington, VA (US)

(73) Assignee: Honeywell International Inc., Morristown, NJ (US)

( * ) Notice: Subject to any disclaimer, the term of this patent is extended or adjusted under 35 U.S.C. 154(b) by 1415 days.

(21) Appl. No.: 10/729,767

(22) Filed: Dec. 8, 2003

(65) Prior Publication Data

US 2005/0125800 A1    Jun. 9, 2005

(51) Int. Cl.
 *G06F 9/44* (2006.01)
 *G06F 12/00* (2006.01)
 *G06F 17/00* (2006.01)
(52) U.S. Cl. ................... 717/122; 717/170; 707/203; 715/229
(58) Field of Classification Search ................ None
 See application file for complete search history.

(56) References Cited

U.S. PATENT DOCUMENTS

| 4,558,413 | A  | * | 12/1985 | Schmidt et al. ............ 707/203 |
| 6,112,024 | A  | * | 8/2000  | Almond et al. ............ 717/122 |
| 6,449,624 | B1 | * | 9/2002  | Hammack et al. ........... 707/203 |
| 6,910,040 | B2 | * | 6/2005  | Emmick et al. ............... 707/8 |
| 6,950,815 | B2 | * | 9/2005  | Tijare et al. ................... 707/1 |
| 6,983,238 | B2 | * | 1/2006  | Gao ............................ 704/8 |
| 2001/0054042 | A1 | * | 12/2001 | Watkins et al. ............. 707/100 |

FOREIGN PATENT DOCUMENTS

WO    WO 00/70417    * 11/2000

OTHER PUBLICATIONS

Hsiao et al., "Integrated XML Document Management", Jan. 1, 2003, Springer-VErlag Berlin Heidelberg, pp. 47-67.*
Al-Khudair et al., "Object-Oriented VErsioning in a Concurrent Engineering Design Environment", 2001, Springer-Verlag Berlin Heidelberg, pp. 105-125.*

* cited by examiner

*Primary Examiner*—Michael J Yigdall
*Assistant Examiner*—Ben C Wang
(74) *Attorney, Agent, or Firm*—Ohlandt, Greeley, Ruggiero & Perle, LLP (57) ABSTRACT

This software invention requires that information be saved with each object that is placed in a source control system. This information includes the name, type, status, version number, and references to parent objects. When the object is checked-out, this information is used to determine the legality of checking-out any dependent objects. A method is used to generate the information that is saved and another method is used to determine which objects need to be checked-out. The dependent objects that need to be checked-out are then automatically checked-out.

9 Claims, 9 Drawing Sheets

Derivation Hierarchy:

```
---LOGIC:AND
    └─ USER: AND_UDT
        └─ USER: AND_UDT_1
```

Instances and Sub-Templates:

| List View | Tree View |

| State | Module | Type of Dependency |
|-------|--------|--------------------|
|       | CM_with_UDTs.AND_INST_1 | Instance |
|       | USER: AND_UDT_1_1 | Sub-Template |
|       | CM_with_UDTs.AND_INST_1_1 | Instance |

*FIG. 10*

DETERMINATION OF DEPENDENT OBJECTS BY A SOURCE CONTROL SYSTEM AND A METHOD TO AUTOMATICALLY INCLUDE THOSE OBJECTS WITH THE PARENT OBJECT WHEN CHANGES ARE ENABLED

BACKGROUND OF THE INVENTION

1. Field of the Invention

The present disclosure generally relates to source control systems. In particular, the present disclosure relates to version control, templates, automatic check-out, process automation, and other applications and features.

2. Discussion of the Background Art

Source control is also known as configuration management or change management. Source control is a discipline of making changes to source code in a planned and systematic fashion. The purpose of source control is to formally control the integrity of artifacts (items) and activities (tasks). Source control has four primary activities: identification, management, status accounting, and auditing.

Identification is the task of identifying (documenting/baselining) artifacts, i.e. the items or objects that make up systems. Some artifacts include software, hardware, and firmware.

Management is the introduction of controls (procedures and quality gates) to ensure products or systems evolve appropriately. Some example areas of focus include deployment and release practices, issue tracking practices, change request practices, asset management practices, and system management practices.

Status accounting is capturing configuration management data, processing data, and using the information. The objective is to provide information to support management and decision making. Some example groups and individuals that benefit from this information are configuration management, security, quality assurance, project managers, and engineers.

Auditing is reviewing the organizational process against the defined or required standards. Some areas of focus include adherence to process, conformance to security, and configuration verification. The purpose of auditing is continual optimization. Auditing is a review that leads to recommendations and corrective updates to the process.

The items under control in a source control system include objects, such as control strategies. In object-oriented programming (OOP), objects are abstractions used in designing a program and they are also the units of code that are eventually derived from the design process. In between, each object is made into a generic class of object and even more generic classes are defined so that objects can share models and reuse the class definitions in their code. Each object is an instance of a particular class or subclass with the class' own methods or procedures and data variables. Thus, objects typically exist in a hierarchy of objects with parent and child relationships. An object is usually a binary, text, or other type of file.

In a source control system, objects are checked-out, edited, and then checked-in. Each time an object is checked-in, it is given a version number. Over time, a history of changes is created for the objects under the control of the source control system.

There is a need for a way to prevent unauthorized changes to dependent objects under control of a source control system, while maintaining the change propagation feature of the parent object, and to eliminate the necessity for a user to determine what the dependencies are for the object, which is time-consuming and error-prone. There is a need for a method to keep track of the information that is necessary to correctly establish the dependencies between parent objects and other objects. This information would then be used by the system to determine what objects must be checked-out, i.e. marked as okay to edit, of the source control system when a parent object is checked-out. The dependent objects would then automatically be checked-out without requiring any user intervention. Then, any changes that are made to the parent object would be propagated to the dependent objects.

SUMMARY OF THE INVENTION

The present invention has many aspects and is directed to determination of dependent objects by a source control system and a method to automatically include those objects with the parent object when changes are enabled that satisfy these and other needs.

One aspect is a source control system for a process control system comprising a processor, a database, and a check-out function. The processor is in a process control system. The database is accessible by the processor to store information associated with an object under source control to be checked-out. The check-out function is operable on the processor to check-out the object, to use the information to determine whether any dependent objects exist, and to automatically check-out any dependent objects. In some embodiments, the system further comprises a propagation function. The propagation function is operable on the processor to propagate changes made to the object to the existing dependent objects, when the object is saved. In some embodiments, the information includes a reference to a parent object, a name, a version number, a type and a status.

Another aspect is a method of automatic check-out for a source control system in a process control system. Information that is associated with an object is stored. A request from a user to check-out the object is received. Whether any dependent objects of the object exist is determined based on the information. The existing dependent objects are automatically checked-out, when the object is checked-out. A check-out status is provided to the user. In some embodiments, one of the existing dependent objects is a derivation child of the object. In some embodiments, the derivation child is automatically checked-out only if the derivation child is checked-in. In some embodiments, any children of the object are automatically checked-out when the object is a user-defined template. In some embodiments, any children of the children of the object are automatically checked-out when the children are user-defined templates. In some embodiments, the existing dependent objects are sorted so that parents come before children.

Another aspect is a data structure for automatic check-out comprising a reference object, a reference object type, and a reference type. The reference object name identifies the object to be checked-out. An automatic check-out function automatically checks-out dependent objects based on the reference type. In some embodiments, the data structures also includes a parent object and a parent version. In some embodiments, the reference object type is composite or basic. In some embodiments, the reference type is parent or contained child.

Another aspect is a computer readable medium, such as a CD, floppy disk, or website, that has executable instructions stored on it. The instructions perform a method of automatic check-out for a source control system in a process control system. Information that is associated with an object is stored. A request from a user to check-out the object is received. Whether any dependent objects of the object exist is determined based on the information. The existing dependent objects are automatically checked-out, when the object is checked-out. A check-out status is provided to the user.

One technical effect is preventing unauthorized changes to dependent objects under control of a source control system, while maintaining the change propagation feature of the parent object, and eliminating the necessity for a user to determine what the dependencies are for the object, which is time-consuming and error-prone. Another technical effect is automatically checking-out objects without requiring any user intervention. Thus the technical effects enable a source control system to operate faster and more efficiently.

BRIEF DESCRIPTION OF THE DRAWINGS

These and other features, aspects, and advantages of the present disclosure will become better understood with reference to the following description, appended claims, and drawings where:

FIG. 2 is a flow chart of an example method for determining object relationships when checking-in;

FIG. 3 is a screenshot of an example user interface for checking-in;

DETAILED DESCRIPTION OF THE PREFERRED EMBODIMENT

Figure 1A:
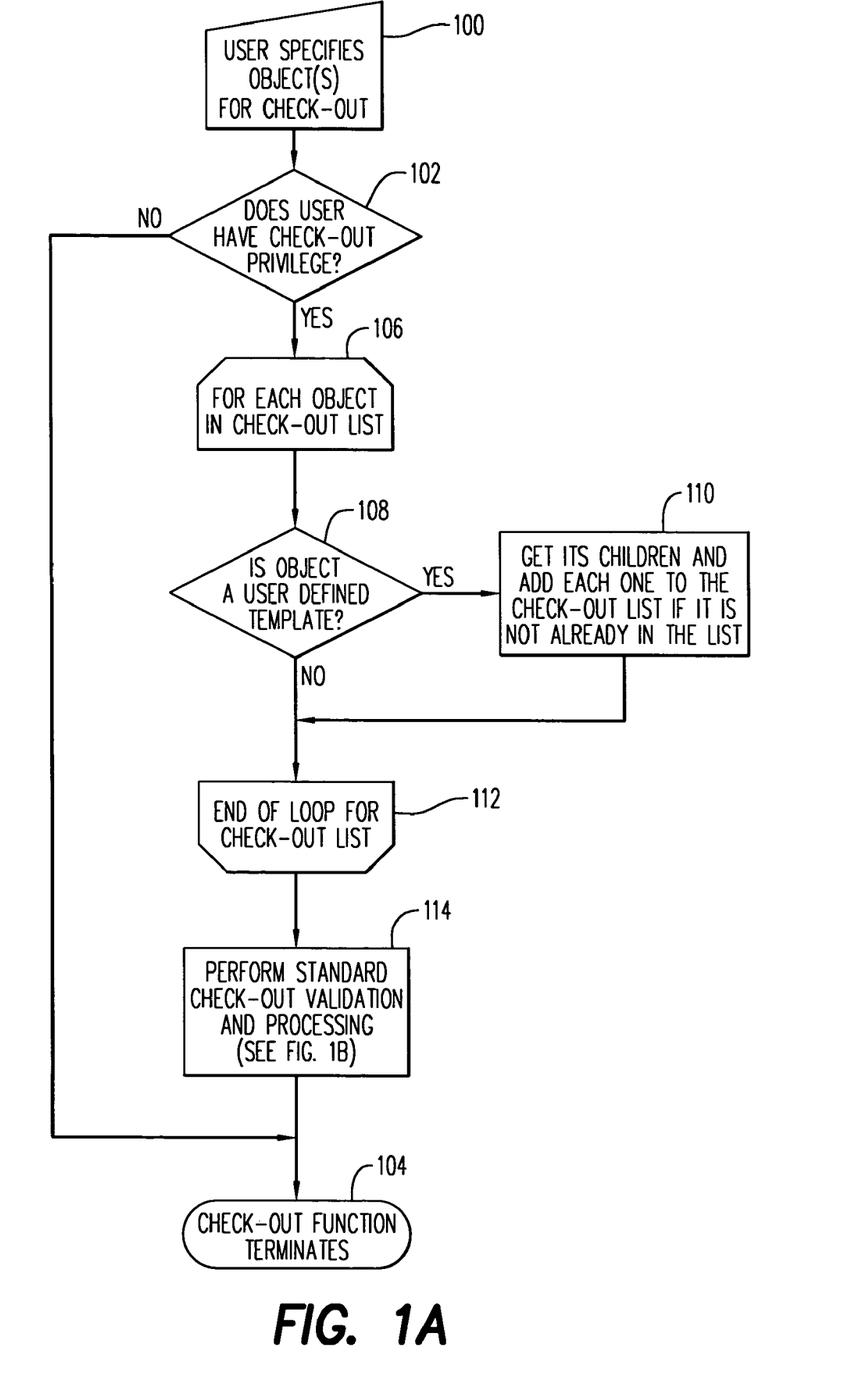
FIGS. 1A-1C are a flow chart of an example method for automatic check-out.
Figure 1B:
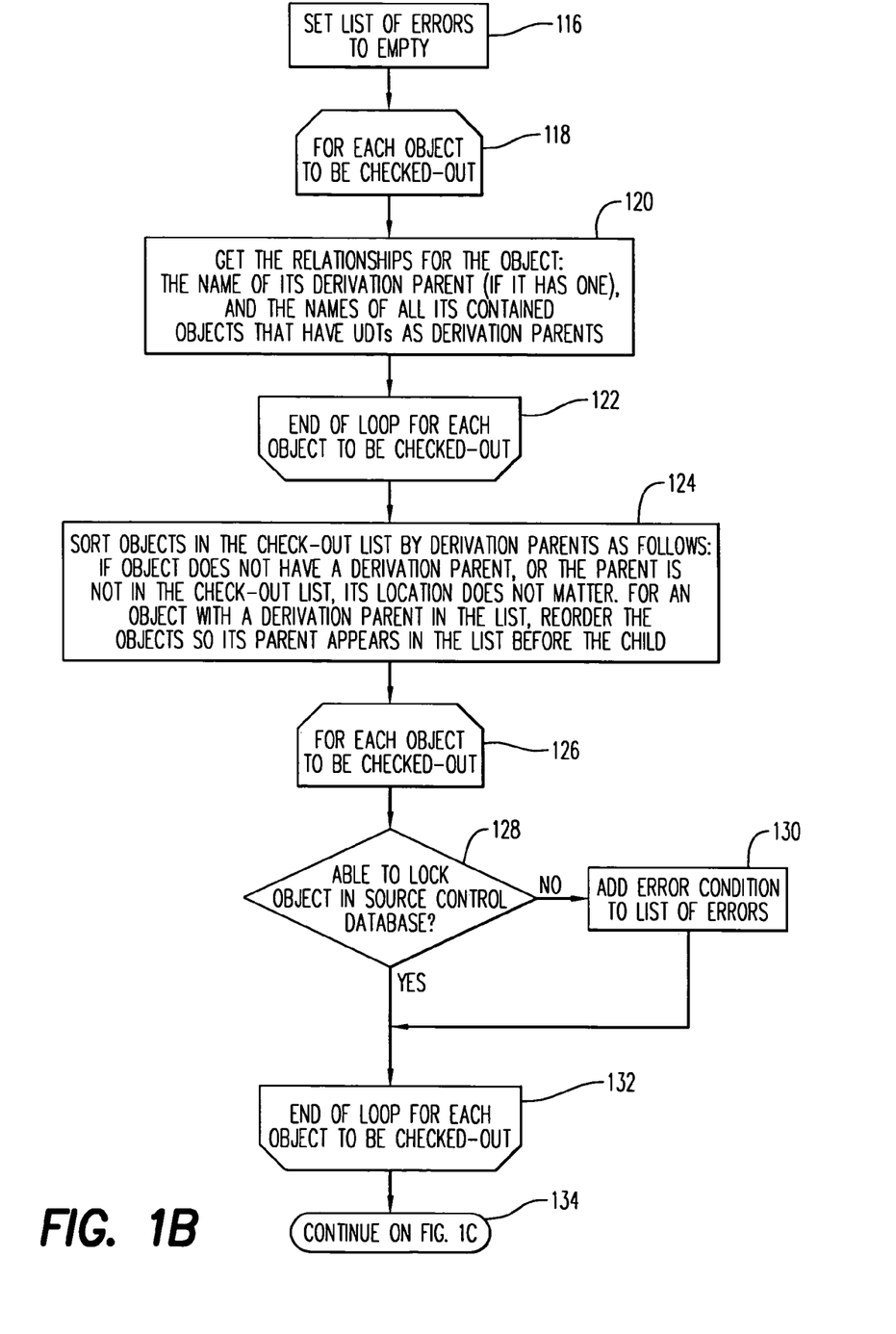
Figure 1C:
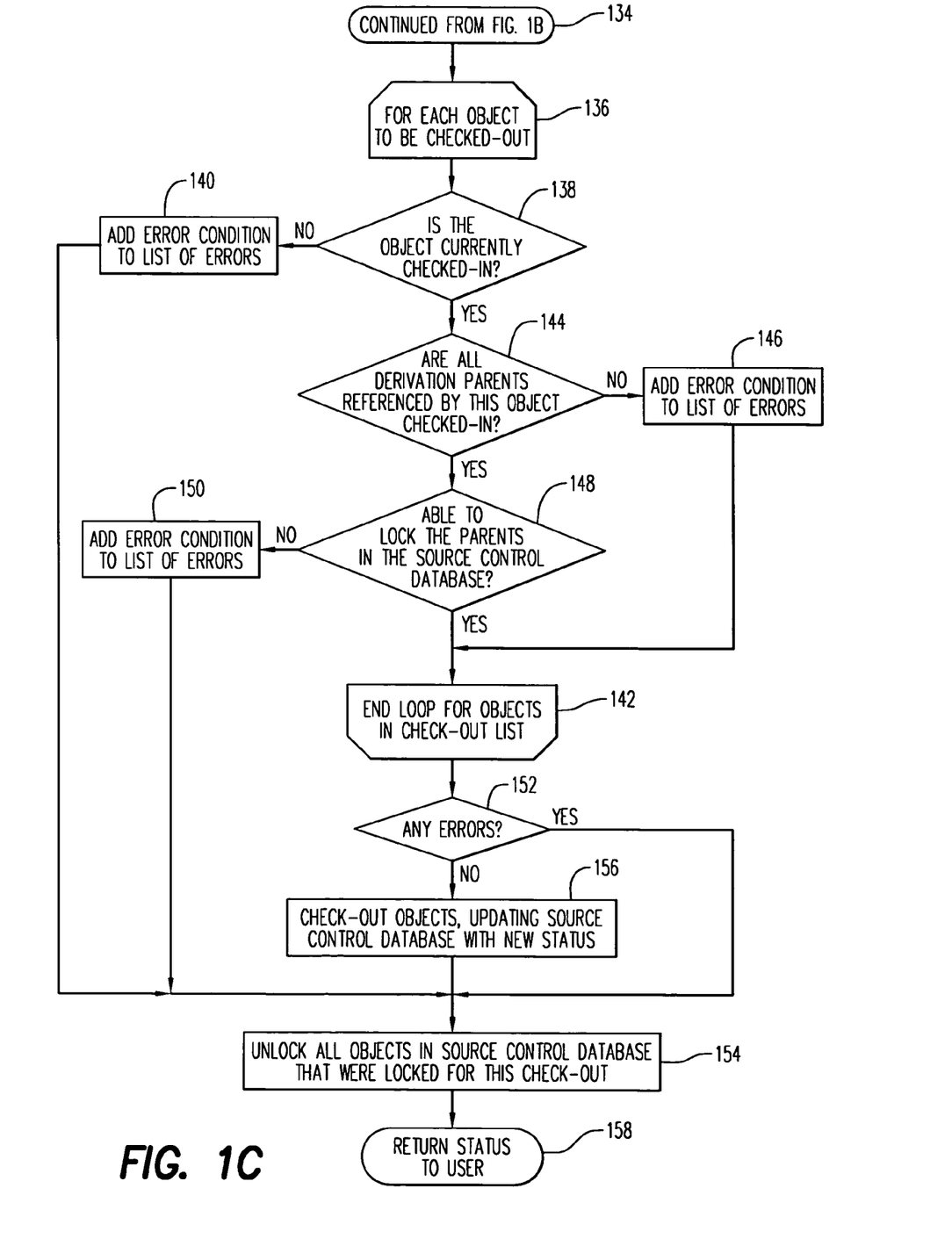

FIGS. 1A-1C show an example method for automatic check-out. In step 100, a user specifies an object to be checked-out. In step 102, it is determined whether the user has the privileges needed to check-out. If not, control flows to step 104 and the check-out function terminates. Otherwise, control flows to step 106. In step 106, for each object in the list, steps 108 and 110 are repeated until the loop is exited at step 112. In step 108, it is determined if the current object is a user-defined template (UDT).

An example process control system has the following types of objects: block types, user-defined templates (UDTs), and instances of block types and UDTs. A block type is a preconfigured object, such as an AND block and has pre-defined parameters and other values. UDTs are objects which are derived from those block types rather than defining their own parameters. A UDT modifies the parameters and values that it inherits from the block type. UDTs are single blocks or blocks containing a collection of blocks based on different block types. UDTs are also derived from other UDTs. An instance of a block type is an object that inherits the parameters from the block type and the user is able to change the values of the parameters the instance independently of the block type values. An instance of a UDT is an object that inherits the blocks and parameters of the UDT and the user is able to change some values independently of the UDT, while other values are inherited from the UDT. Thus, there are various levels of dependency. In other example process control systems, some objects are placed under a source control system that regulates and tracks changes to objects, and it is necessary for the source control system to insure that the objects maintain the dependencies and value inheritance.

Propagation is an action that happens when the user changes a value in a template. If a user changes a parameter or value in a template, such as a UDT and saves the template, that parameter is automatically updated in every place that UDT is used. The value is updated in all the occurrences of that template, for any strategies that were instantiated from the template, and any other templates that were derived from that template (all its children). This is why an automatic check-out is advantageous. Instead of the user having to find every instance of a template that the user wants to change, the auto check-out function automatically locates every instance for the user and checks-out every instance.

In step 108, if the current object is a UDT, the children of the UDT are retrieved and each of the children are added to a check-out list, if it is not already in the list, i.e., redundancy is avoided. After exiting the loop in step 112, step 114 performs standard check-out validation and processing. FIG. 1B shows the check-out validation and processing in more detail.

FIG. 1B shows a method of check-out validation in more detail for step 114 of FIG. 1A. In step 116, a list of errors is set to empty. All error processing described for the present invention is optional and may be performed in many different ways. In step 118, a loop begins that is repeated for each object to be checked-out. Inside this loop, in step 120, the relationships for the current object are retrieved, the name of the current object's derivation parent (if it has one) is retrieved, and the names of all of the current object's contained objects that have UDTs as derivation parents are retrieved. A derivation parent is an object that is in a parent-child relationship with the object to be checked-out. The loop from step 118 to step 122 repeats for each object to be checked-out and exits at step 122 so that control flows to step 124. In step 124, objects in the check-out list are sorted by derivation parent. If an object in the list does not have a derivation parent, or the parent is not in the check-out list, the location of the object does not matter. For an object with a derivation parent in the list, the objects are re-ordered so that each parent appears in the list before its child. A loop starts at step 126 and repeats for each object to be checked out. In step 128, it is determined whether the current object in the source control database can be locked. The source control system has a database to store various information about each object under its control. If the current object cannot be locked, an error condition is added to the list of errors in step 130. Regardless of the success or failure of the locking, the loop repeats until each object to be checked-out is processed. When all the objects have been processed, the loop exits at step 132. FIG. 1B continues onto FIG. 1C at connection point 134.

In FIG. 1C step 136, a loop is performed for each object to be checked out. In step 138, it is determined if the current object is currently checked-in. If not, an error condition is added to the list of errors in step 140 and the loop repeats for the next object, if there is one, or exits at step 142. If so, it is determined whether all derivation parents referenced by the current object are checked-in in step 144. If not, an error condition is added to the list of errors in step 146 and the loop repeats for the next object, if there is one, or exists at step 142. If so, control flows to step 148. In step 148, it is determined whether the parents can be locked in the source control database. If not, an error condition is added to the list of errors in step 150 and the loop repeats for the next object, if there is one, or exists at step 142. If so, the loop repeats for the next object, if there is one, or exists at step 142. After the loop from step 138 to step 142, control flows to step 152. In step 152, it is determined if there are any errors. If so, control flows to step 154, else control flows to step 156. In step 154, all the objects in the source control database that were locked as part of the check-out request are unlocked. In step 156 the objects are checked-out, updating the source control database with a new status and then control flows to step 154. After step 154, the status is returned to the user in step 158.

Figure 2:
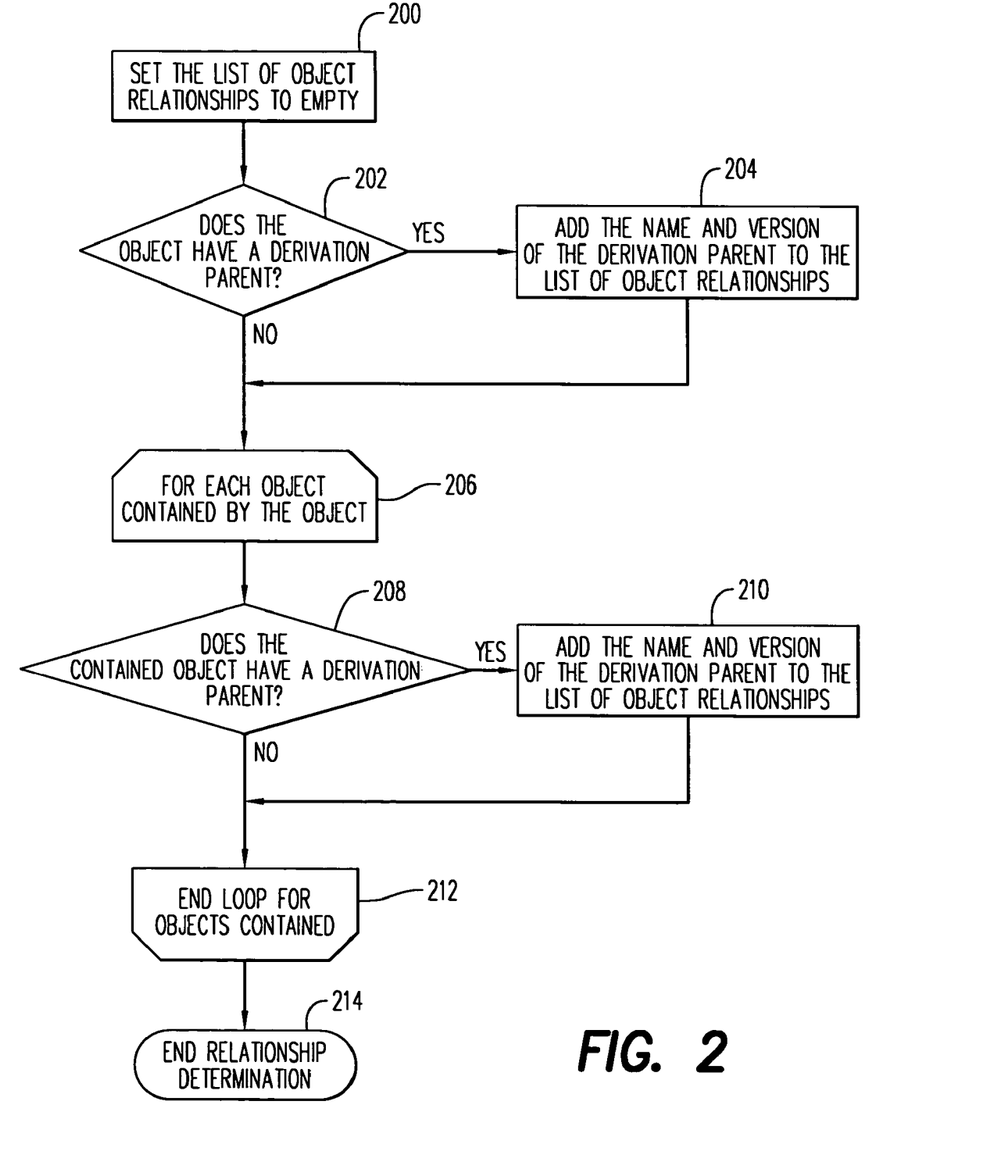

FIG. 2 shows an example method for determining object relationships when checking-in. In step 200, a list of object relationships is set to a empty list. In step 202, it is determined whether the object to be checked-in has a derivation parent. If so, the name and version of the derivation parent is added to the list of object relationships in step 204. If not, a loop begins for each object contained by the object in step 206. In this loop, it is determined if the current contained object has a derivation parent in step 208. If so, the name and version of the derivation parent is added to the list of object relationships in step 210. If not, either the loop repeats for the next contained object or exits at step 212. The method for determining object relationships ends at step 214.

Figure 3:
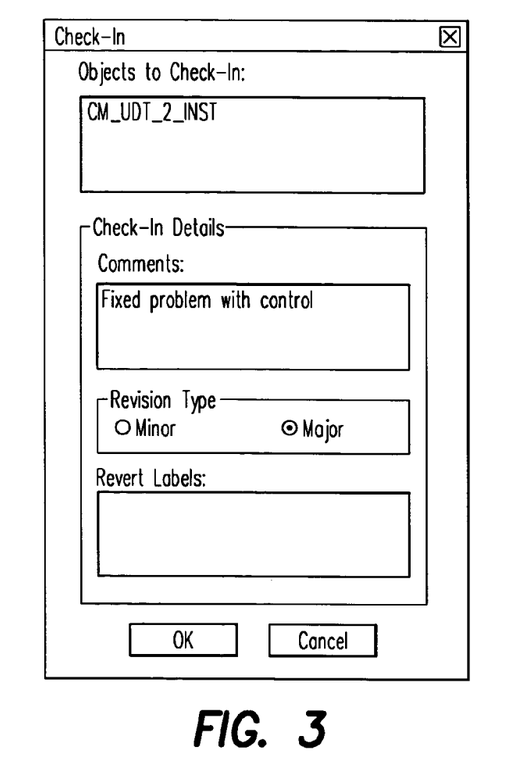

FIG. 3 shows an example user interface for checking-in. In this example, the user is checking in an object called "CM_UDT_2_INST" with the comments "Fixed problem with control" and a revision type of major.

Figure 4:
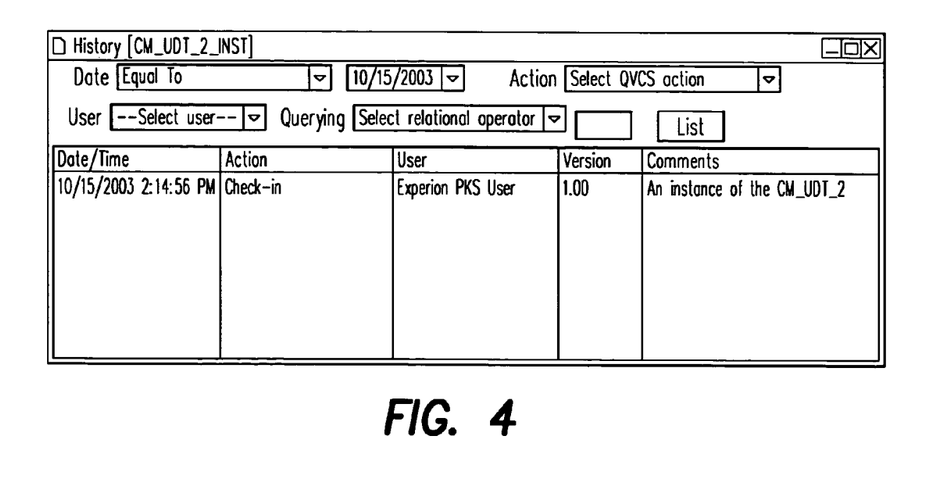
FIG. 4 is a screenshot of an example version history for an object before it is automatically checked-out.

FIG. 4 shows an example version history for an object before it is automatically checked-out. In this example, version 1.00 of object "CM_UDT_2_INST" was checked-in on Oct. 15, 2003 with the comment "An instance of the CM_UDT_2".

Figure 5:
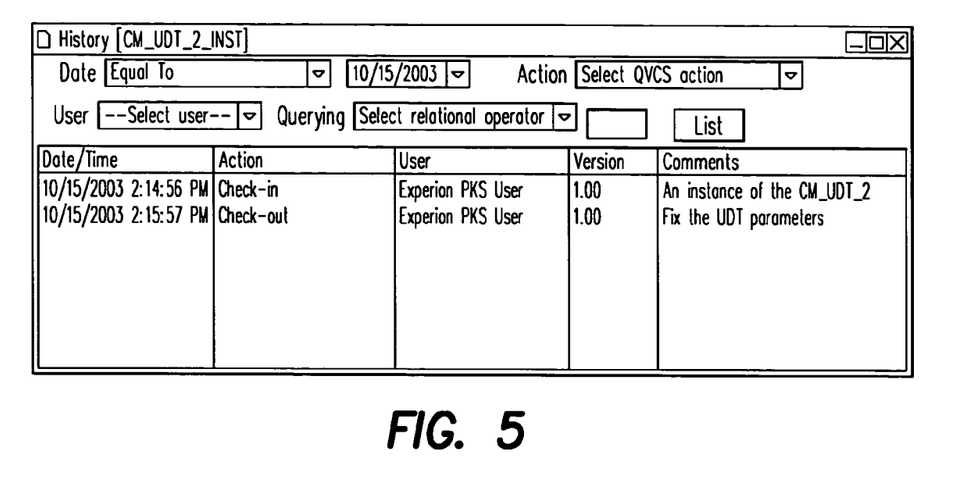
FIG. 5 is a screenshot of an example version history for an object after it was automatically checked-out.

FIG. 5 shows an example version history for an object after it was automatically checked-out. In this example, version 1.00 of object "CM_UDT_2_INST" was automatically checked-out on Oct. 15, 2003 with the comment "Fix the UDT parameters".

Figure 6:
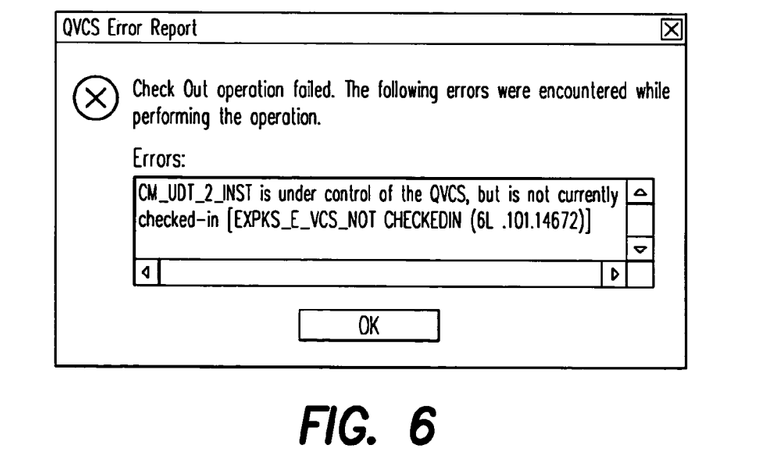
FIG. 6 is a screenshot of an example user interface for an error message that occurs when a user attempted to check-out an object when it has a dependent object in a incorrect state.

FIG. 6 shows an example user interface for an error message that occurs when a user attempted to check-out an object when it has a dependent object in a incorrect state.

Figure 7:
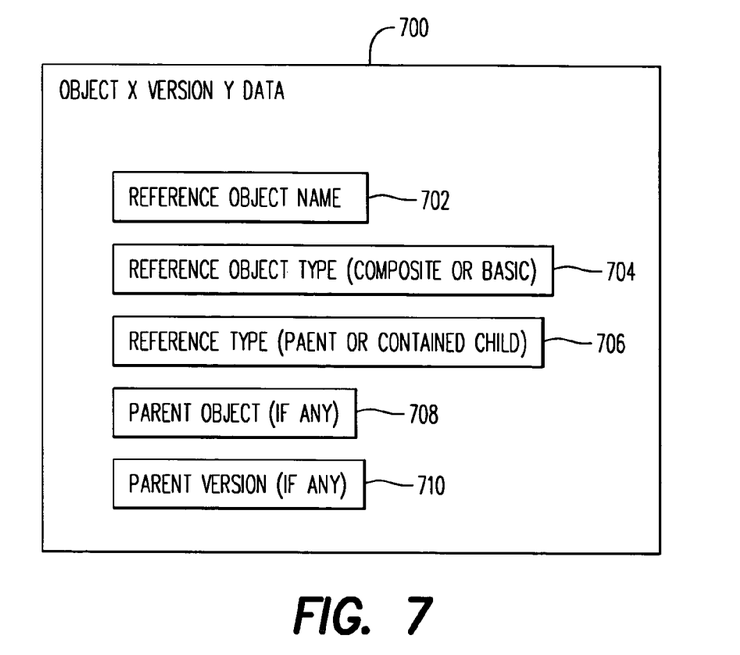
FIG. 7 is an example data structure for holding data used to determine dependencies for an object.

FIG. 7 shows an example data structure for holding data used to determine dependencies for an object. In this example, an object named X with version "y" has a data structure 700 associated with it having the following parts: a reference object name 702, a reference object type (composite or basic) 704, a reference type (parent or contained child) 706, a parent object (if any) 708, and a parent version (if any) 710. In this example, data structure 700 is stored in a database for each object in the source control system. In some embodiments, more or less or other fields are stored in data structure 700.

Figure 8:
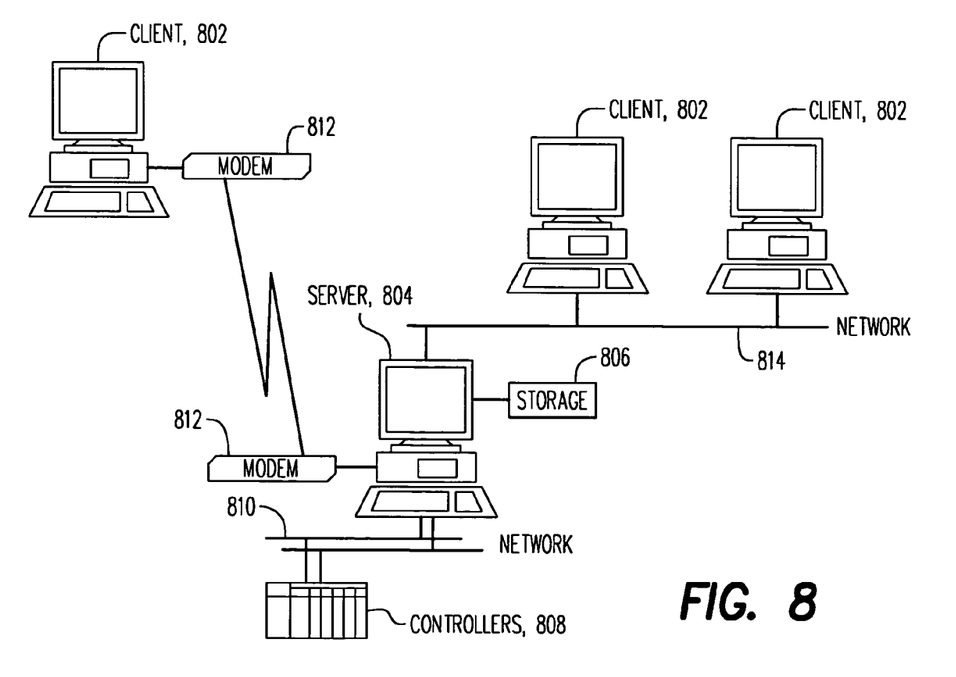
FIG. 8 is a block diagram of an example system architecture for operating a source control system having a method of automatic check-out.

FIG. 8 shows an example system architecture for operating a source control system having a method of automatic check-out. When an object is checked out of the source control system, by a client 802 or server 804, certain other objects are automatically checked-out. Client 802 and server 804 are any type of processor, such as a computer. The present invention may be implemented with computers that are both client and server or on a single processor or many other configurations. The automatic check-out may be used in the Qualification and Version Control System (QVCS™) for the Experion Process Knowledge System (Experion PKS™) from Honeywell International. However, the present invention is applicable to many other source control systems and other system architectures. In this example, server 804 has access to storage 806. Storage 806 includes an Engineering Repository Database (ERDB), which holds the definition of the current control strategies, templates, and the like. Storage 806 may have various libraries associated with it. The ERDB holds data associated with objects in the source control system, such as data structure 700. Storage 806 also includes another database for holding source control information, such as structure 700, version histories, audit trails, and the like. When an object is checked-out, data structure 700 is used to determine the legality of checking-out any dependent objects. In this example, server 804 is part of a process control system and has access to various controllers 808 over a network 810 and clients 802 are in communication with server 804 via modem 812 or a network 814.

Figure 9:
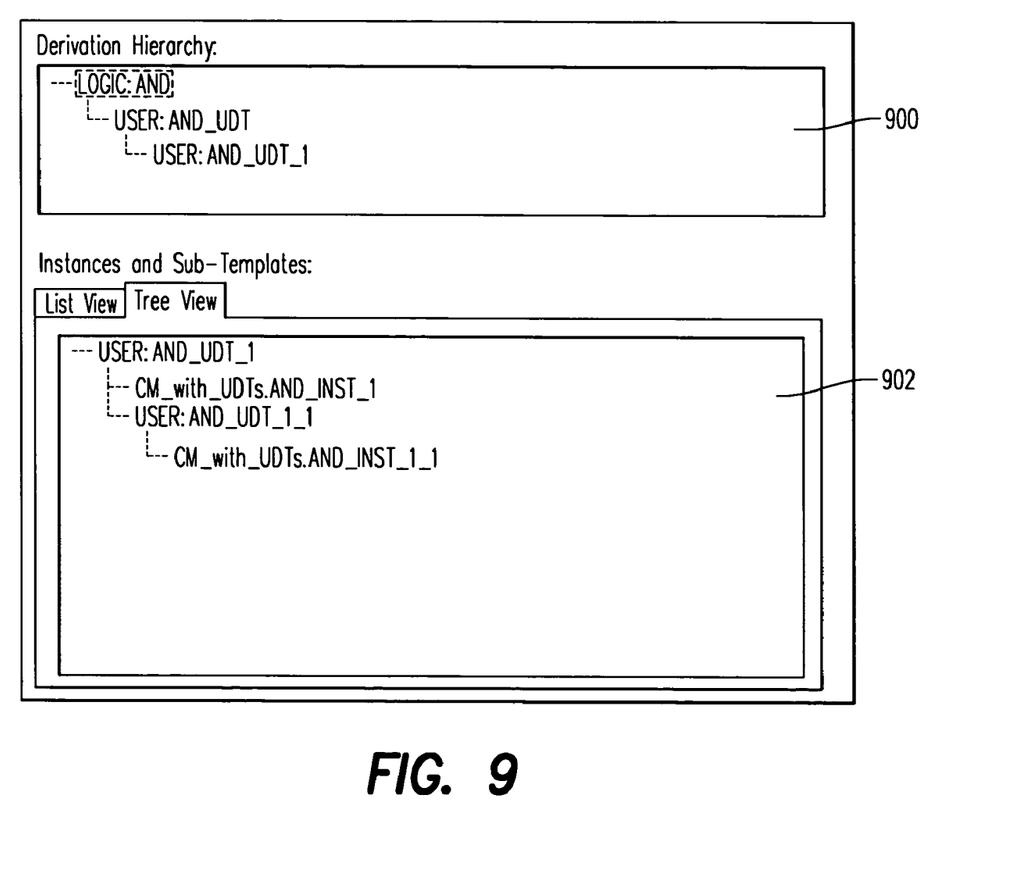
FIG. 9 is a screenshot of an example display of derivation and dependency relationships for a user-defined template (UDT) as a tree view.
Figure 10:
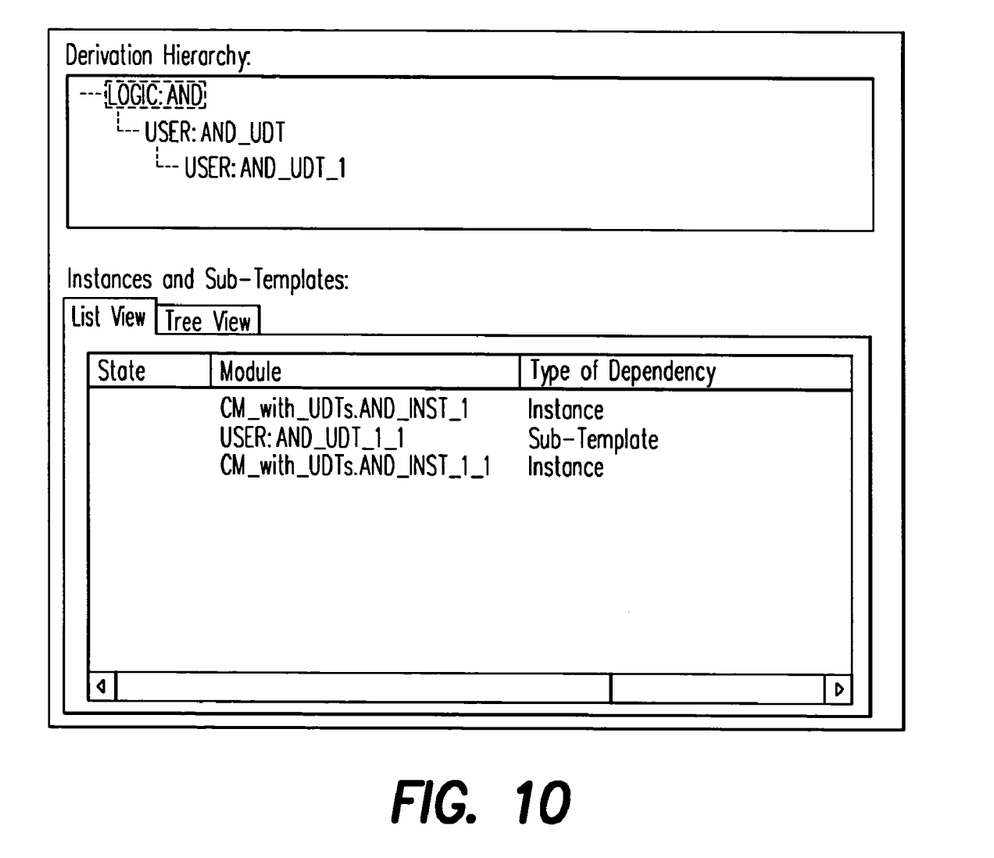
FIG. 10 is a screenshot of an example display of derivation and dependency relationships for the UDT in FIG. 9 as text information.

FIGS. 9 and 10 show an example display of derivation and dependency relationships for a user-defined template (UDT). FIG. 9 shows it as a tree view, while FIG. 10 shows it as text information. The UDT is named "USER:AND_UDT_1". FIG. 9 shows a top panel 900 for derivation hierarchy and a bottom panel 902 for instances and sub-templates. Top panel 900 shows that "USER:AND_UDT_1" is derived from "USER:AND_UDT" and that "USER:AND_UDT" is derived from the block type named "LOGIC:AND". Bottom panel 902 shows that an instance of "USER:AND_UDT_1" exists in the strategy "CM_with_UDTs" and is named "AND_INST_1". Also, "USER:AND_UDT_1_1" is derived from "USER:AND_UDT_1" and that an instance of "USER:AND_UDT_1_1" exists in "CM_with_UDTs" and is named "AND_INST_1_1". FIG. 10 shows the same information as text, including a column for the type of dependency.

In an example embodiment, when a template is modified, a method selects the derived templates and instances referring to that template so that the derivation children are updated. The rationale for this method is that a user may change the operating characteristics of a UDT, and those changes are reflected in all of the derived templates and instances of that UDT. The source control system tracks those changes.

In this example, if a derived child object is under control of the source control system, its derivation parent is an object that is also under control of the source control system.

In this example, if an "undo" check-out action is performed on a template, then an "undo" check-out is performed for each of its derived children. It is possible to change the derivation parent of an object by checking-out the object from the source control system and selecting "change derivation parent" from a menu. It is not permitted to check-in an object derived from a user template, unless its derivation parent is first checked-into the source control system.

In this example, in an installation without source control, when a UDT is modified, all derived templates and instantiated children are automatically modified. This is also true in an installation with source control for any derived children (other templates and strategies) of UDTs that have not been placed under source control. All of the objects with the derivation parent that is being modified need to be checked-out of the source control system for any changes to be made. This is why an automatic check-out function is useful. The updated children remain checked-out, because the template is not checked in. Once the template is checked-in, then all of the derived children can also be checked-in.

It is to be understood that the above description is intended to be illustrative and not restrictive. Many other embodiments will be apparent to those of skill in the art upon reviewing the above description, such as adaptations of the present disclosure to source control for applications other than process control systems. Various designs using hardware, software, and firmware are contemplated by the present disclosure, even though some minor elements would need to change to better support the environments common to such systems and methods. The present disclosure has applicability to fields outside process control, such as software development environments and other kinds of systems needing source control. Therefore, the scope of the present disclosure should be determined with reference to the appended claims, along with the full scope of equivalents to which such claims are entitled.

What is claimed is:

1. A source control system for a process control system, comprising:
   a processor in a process control system;
   a database accessible by said processor to store information associated with an object under source control to be checked-out; and
   a check-out function operable on said processor (a) to check-out said object, wherein said object being checked out is a user defined template (UDT) that is derived from a preconfigured block type object and that inherits pre-defined parameters from said pre-defined block object, wherein any existing dependent objects are children (UDTs) of said object being checked out or instances of said object being checked out, wherein said instances are objects that inherit block type objects and parameters of said UDT or of said children UDTs, and wherein said stored information includes a reference to an existing parent object, (b) to propagate changes made to said object to any of said existing dependent objects, when said object is saved, (c) to use said information to determine whether any of said dependent objects exist and whether at least one parent object exists, and (d) to automatically check-out said existing dependent object.

2. The system according to claim 1, wherein said changes are further propagated to said existing parent object, when said object being checked out is saved.

3. The system according to claim 1, wherein said stored information is at least one selected from the group consisting of: a name, a version number, a type and a status, and wherein said stored information is further used by said processor to prevent unauthorized changes to dependent objects under control of said source control system.

4. A method of automatic check-out for a source control system in a process control system, comprising:
   storing information associated with an object under source control to be checked-out;
   receiving a request from a user to check-out said object;
   determining whether any dependent objects of said object being checked out exist and whether any parent objects exist based on said information, wherein said object being checked out is a user defined template (UDT) that is derived from a preconfigured block type object and that inherits pre-defined parameters from said pre-defined block object, wherein any existing dependent objects are children (UDTs) of said object being checked out or instances of said object being checked out, wherein said instances are objects that inherit block type objects and parameters of said UDT or of said children UDTs, and wherein said stored information includes a reference to said existing parent objects;
   propagating changes made to said object to any of said existing dependant objects, when said object is saved;
   automatically checking-out said existing dependent objects when said object is checked-out; and
   providing a status to said user.

5. The method according to claim 4, further comprising:
   sorting said existing dependent objects so that said existing parents precede children.

6. The method according to claim 4, wherein one of said existing dependent objects is a derivation child of said object being checked out.

7. The method according to claim 6, further comprising:
   automatically checking-out said derivation child only if said derivation child is checked-in.

8. A computer readable medium having executable instructions stored thereon to perform a method of version control for a process control system, said method comprising:
   when checking-in an object, wherein said checked-in object is a user defined template (UDT) that is derived from a preconfigured block type object and that inherits pre-defined parameters from said pre-defined block object, determining relationships of said object by:
      determining whether said object being checked-in has a first derivation parent;
      adding a name and a version of said first derivation parent to a list of object relationships, if said object being checked-in has said first derivation parent, wherein said first derivation parent is a first parent UDT of said object being checked-in of a first instance of said object being checked-in, wherein said first instance is an object that inherits block type objects and parameters of said UDT, or of said first parent UDT;
   if said object being checked-in does not have said first derivation parent, determining if each contained object, which is contained in said object being checked-in, has a second derivation parent;
      adding a name and a version of said second derivation parent to said list of object relationships, if said contained object being checked-in has said second derivation parent; and
      providing said list of object relationships.

9. A computer readable medium having executable instructions stored thereon to perform a method of automatic check-out for a source control system in a process control system, said method comprising
   storing information associated with an object under source control to be checked-out;
   receiving a request from a user to check-out said object;
   determining whether any dependent objects of said object being checked-out exist and whether at least one parent object of said object exists based on said information, wherein said object being checked out is a user defined template (UDT) that is derived from a preconfigured block type object and that inherits pre-defined parameters from said pre-defined block object, wherein any existing dependent objects are children (UDTs) of said object being checked out or instances of said object being checked out, wherein said instances are objects that inherit block type objects and parameters of said UDT or of said children UDTs, and wherein said stored information includes a reference to said existing parent object;
   propagating changes made to said object to any of said existing dependant objects, when said object is saved:
   automatically checking-out said existing dependent objects when said object being checked-out is checked-out; and
   providing a status to said user.

* * * * *